(12) United States Patent
Lu et al.

(10) Patent No.: US 11,882,039 B1
(45) Date of Patent: Jan. 23, 2024

(54) UDF-BASED TRAFFIC OFFLOADING METHODS AND SYSTEMS

(71) Applicant: ZHEJIANG LAB, Hangzhou (CN)

(72) Inventors: Donghui Lu, Hangzhou (CN); Linlin Yan, Hangzhou (CN); Tao Zou, Hangzhou (CN)

(73) Assignee: ZHEJIANG LAB, Hangzhou (CN)

(*) Notice: Subject to any disclaimer, the term of this patent is extended or adjusted under 35 U.S.C. 154(b) by 0 days.

(21) Appl. No.: 18/252,179

(22) PCT Filed: Feb. 21, 2023

(86) PCT No.: PCT/CN2023/077339
§ 371 (c)(1),
(2) Date: May 8, 2023

(30) Foreign Application Priority Data

Jul. 27, 2022 (CN) .......................... 202210888382.0

(51) Int. Cl.
*H04L 47/122* (2022.01)
*H04L 47/2441* (2022.01)
*H04L 47/20* (2022.01)

(52) U.S. Cl.
CPC ............ *H04L 47/122* (2013.01); *H04L 47/20* (2013.01); *H04L 47/2441* (2013.01)

(58) Field of Classification Search
CPC ... H04L 47/122; H04L 47/20; H04L 47/2441; H04L 47/10; H04L 47/12; H04L 47/125–127
See application file for complete search history.

(56) References Cited

U.S. PATENT DOCUMENTS

2020/0053190 A1* 2/2020 Uddin ..................... H04L 45/64
2022/0278946 A1* 9/2022 Raghupatruni ..... H04L 49/9005

FOREIGN PATENT DOCUMENTS

CN 108494800 A 9/2018
CN 112367278 A 2/2021
(Continued)

OTHER PUBLICATIONS

Yu, Y., "Survey on the Languages in the Northbound Interface of Software Defined Networking," Journal of Software, vol. 27, No. 4, Jan. 18, 2016, 16 pages.
(Continued)

*Primary Examiner* — Khaled M Kassim
*Assistant Examiner* — Najeeb Ansari
(74) *Attorney, Agent, or Firm* — McCoy Russell LLP

(57) ABSTRACT

The present disclosure discloses a UDF-based traffic offloading method and a system, the method includes: step 1, performing P4 language programming: performing P4 language programming description on a protocol packet format of the target traffic in a network and a corresponding flow table description on a protocol packet format of the target packet and parsing, matching and offloading rules of the target packet; step 2: compiling and mapping the P4 program by UDF-oriented compilation and mapping method, to an ASIC chip; step 3: in the ASIC chip, matching a traffic offloading rule according to the UDF rule, and executing a traffic offloading action according to the traffic offloading rule, where the traffic offloading action includes offloading the target packet to a corresponding processing node or discarding the target packet.

5 Claims, 4 Drawing Sheets

(56) References Cited

FOREIGN PATENT DOCUMENTS

| | | |
|---|---|---|
| CN | 113285892 A | 8/2021 |
| CN | 113765857 A | 12/2021 |

OTHER PUBLICATIONS

Liu, Y., "Research on the Application of P4 Technology in Edge Computing," Information and Communications Technologies, No. 4, Aug. 2020, 6 pages.

State Intellectual Property Office of the People's Republic of China, Office Action and Search Report Issued in Application No. 202210888382.0, dated Sep. 19, 2022, 23 pages. (Submitted with Machine/Partial Translation).

State Intellectual Property Office of the People's Republic of China, Office Action and Search Report Issued in Application No. 202210888382.0, dated Oct. 31, 2022, 22 pages. (Submitted with Machine/Partial Translation).

\* cited by examiner

UDF-BASED TRAFFIC OFFLOADING METHODS AND SYSTEMS

CROSS REFERENCE TO RELATED APPLICATIONS

This application is a US National Phase of a PCT Application No. PCT/CN2023/077339 filed on Feb. 21, 2023, which claims priority to Chinese Patent Application No. 202210888382.0 filed on Jul. 27, 2022, the entire contents of which are incorporated herein by reference in their entireties.

TECHNICAL FIELD

The present disclosure relates to a technical field of network communication, in particular to UDF-based traffic offloading methods and systems.

BACKGROUND

Limited by the fact that the current Internet network facilities mainly use the single address identification and addressing and routing technology based on IP (Internet Protocol) address, a large number of existing network nodes cannot process the new network protocol packet. Further, according to the business scenario, the protocol traffic often involves a large amount of storage and computing, which brings some network nodes storage and computing pressure beyond their function and performance, and ultimately damages the normal operation of some network nodes and even the entire network.

Common technical solutions include upgrading new equipment or even reconstructing the network to support the processing of new network protocols, which brings a large cost of equipment and time. In addition, programmable network devices and SDN (Software Defined Network) controllers are used to support the processing of the traffic by sending the target traffic packet to the controller to obtain the flow table, which brings large equipment costs, and the process of sending and processing the packet and sending flow table will affect the real-time processing of the protocol packet.

In traffic offloading technology, according to certain conditions, the traffic to be offloaded in the network can bypass some nodes or the core network and be directly forwarded to other nodes, which can not only reduce the data transmission delay, but also reduce the throughput of some nodes and transmission cost. At present, there is a lack of traffic offloading technology to offload protocol traffic that cannot be processed by subsequent network nodes and involves a large amount of storage or computation to the current node or corresponding processing node.

The chip supporting User Defined Field (UDF) has certain new protocol parsing capability by providing users with the ability to customize packet headers.

SUMMARY

In order to solve the above technical problems existing in the prior art, in a first aspect, the present disclosure provides a UDF-based traffic offloading method, including: Step 1, in response to receiving a target packet for target traffic in a network, performing P4 language programming description on a protocol packet format of the target packet and parsing, matching and offloading rules of the target packet, to obtain a P4 program; and performing description for a corresponding flow table on the parsing, matching and offloading rules of the target packet; Step 2, compiling and mapping the P4 program by UDF-oriented compilation and mapping method, to obtain a UDF rule, and sending the UDF rule to an ASIC chip; Step 3: in the ASIC chip, matching a traffic offloading rule according to the UDF rule, and executing a traffic offloading action according to the traffic offloading rule, where the traffic offloading action includes offloading the target packet to a corresponding processing node or discarding the target packet.

In some embodiments, the target traffic in the network is a packet traffic processed by the corresponding processing node, involving a large amount of computation and storage, and difficult to be processed by some nodes or core network, and including: named data network protocol traffic, mobile first network protocol traffic or geographic identification network protocol traffic.

In some embodiments, the step 2, compiling and mapping the P4 program by UDF-oriented compilation and mapping method, to obtain a UDF rule, and sending the UDF rule to an ASIC chip, including: step S2.1, performing front-end compilation for the P4 program to generate a front-end compilation result in JSON format; step S2.2, performing UDF-oriented back-end compilation for the P4 program to obtain a back-end compilation result, where performing UDF-oriented back-end compilation for the P4 program to obtain the back-end compilation result, including: extracting a key field, an offset field, a length field, a mask field and a value field of the target packet from the front-end compilation result and the corresponding flow table to obtain the back-end compilation result; step S2.3, mapping fields corresponding to the UDF rule in the back-end compilation result to generate the corresponding UDF rule; step S2.4, sending the UDF rule to the ASIC chip that supports UDF.

In some embodiments, the step 3: in the ASIC chip, matching a traffic offloading rule according to the UDF rule, and executing a traffic offloading action according to the traffic offloading rule, including: step S3.1, retrieving a table entry corresponding to the target packet in a UDF rule table in the ASIC chip; step S3.2, determining an identification field of the target packet according to the table entry corresponding to the target packet, and performing matching according to the UDF rule of the table entry corresponding to the target packet to determine the corresponding traffic offloading rule; step S3.3, determining the traffic offloading action from an action table according to the traffic offloading rule; step S3.4, executing the traffic offloading action, where the traffic offloading action includes offloading the target packet to a corresponding processing node or discarding the target packet.

In some embodiments, the step S3.2, determining an identification field of the target packet according to the table entry corresponding to the target packet, and performing matching according to the UDF rule of the table entry corresponding to the target packet to determine the corresponding traffic offloading rule, including: step S3.2.1, determining an offloading identification field of the target packet according to the offset field and the length field in the UDF rule of the table entry corresponding to the target packet; step S3.2.2, extracting the offloading identification field, and performing "AND" calculation on the offloading identification field and the mask field in the UDF rule of the table entry corresponding to the target packet, to obtain a valid matching value; step S3.2.3, matching the valid matching value with the value field in the UDF rule of the table entry corresponding to the target packet, and in response to determining that the valid matching value is equal to the value field in the UDF rule of the table entry corresponding to the target packet, determining the traffic offloading rule of the target packet, where the traffic offloading rule includes: ID, the key field, the offset field and the length field of the table entry corresponding to the target packet.

In some embodiments, the step S3.3, determining the traffic offloading action from an action table according to the traffic offloading rule, including: forming a binary group index (e.g. a two-tuple index) according to the ID and the key field of the table entry corresponding to the target packet, and matching the corresponding traffic offloading action from the action table.

In a second aspect, the present disclosure provides a UDF-based traffic offloading system, including a P4 compiling module, a UDF retrieving module, a UDF matching module, an action matching module and an action executing module, where the P4 compiling module is configured to perform front-end and UDF-oriented back-end compilation for a P4 program corresponding to a target packet for target traffic, map a compilation result to a UDF rule and send the UDF rule to an ASIC chip; the UDF retrieving module is configured to, in response to receiving the target packet, retrieve a table entry corresponding to the target packet in a UDF rule table in the ASIC chip; the UDF matching module is configured to determine an identification field of the target packet according to the table entry corresponding to the target packet, and perform matching according to the UDF rule of the table entry corresponding to the target packet to obtain a corresponding traffic offloading rule; the action matching module is configured to determine a traffic offloading action from an action table according to a key field, an offset field, a length field, a mask field and a value field of the matched traffic offloading rule; and the action executing module is configured to, according to the traffic offloading action, offload the target packet to a corresponding computing storage processing node or discard the target packet; where the UDF retrieving module, the UDF matching module, the action matching module and the action executing module run on an ASIC chip that supports UDF function.

In a third aspect, the present disclosure provides a UDF-based traffic offloading apparatus, including one or more processors, configured to realize the UDF-based traffic offloading method described above.

In a fourth aspect, the present disclosure provides a computer-readable storage medium, where a program is stored on the storage medium, and when the program is executed by a processor, the UDF-based traffic offloading method described above is realized.

The technical solutions provided by embodiments of the present disclosure have following beneficial effects. In the present disclosure, programming offloading rules for target traffic oriented to programmable language P4 is implemented. On the one hand, the offloading of target traffic is realized based on the ASIC chip supporting UDF, which effectively reduces the data traffic in key nodes or core networks, reduces the computing and storage load, and improves the overall operation efficiency of the network. On the other hand, P4 programming is used to describe the traffic offloading rules, which improves the programmability and flexibility of traffic offloading, and helps to make better use of chip performance.

DETAILED DESCRIPTION OF THE EMBODIMENTS

In order to make the purposes, technical solutions and technical effects of the present disclosure clearer, the present disclosure is further described in detail in the following with reference to the drawings and embodiments of the specification.

Figure 2:
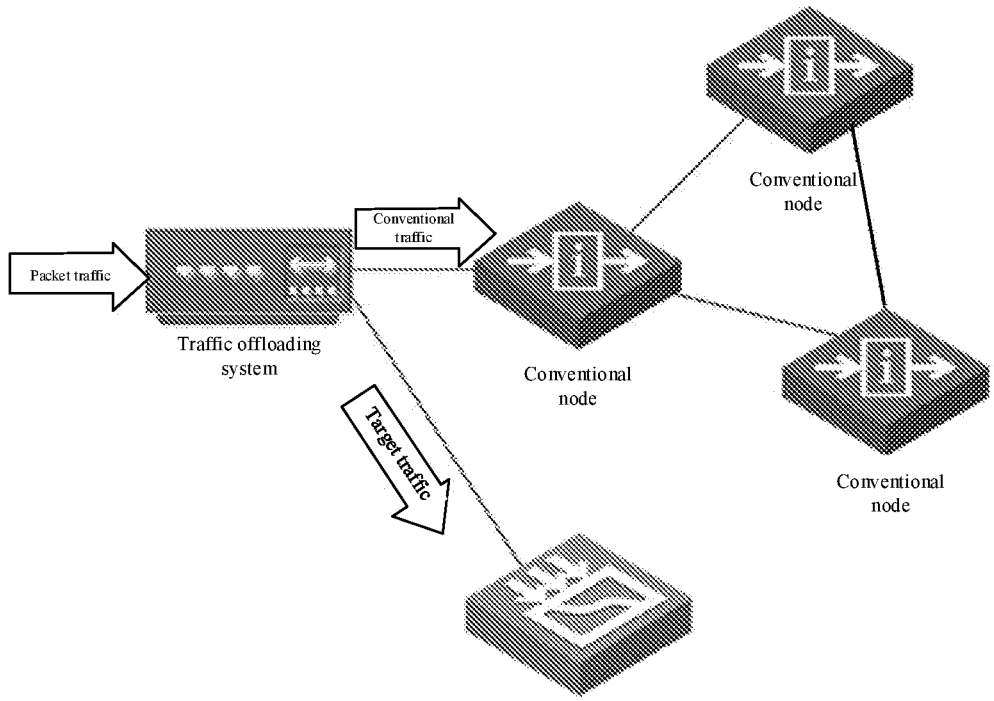
FIG. 2 is a network topology diagram of a system according to an embodiment of the present disclosure.

The present disclosure is realized through the following technical solutions. As shown in FIG. 2, according to the present disclosure, by arranging the UDF-based traffic offloading method and apparatus in front of the conventional network node or the core network, the target traffic that is not easy to be processed or cannot be processed is offloaded to the corresponding processing network node for processing, thereby improving the efficiency of the overall network operation.

Figure 1:
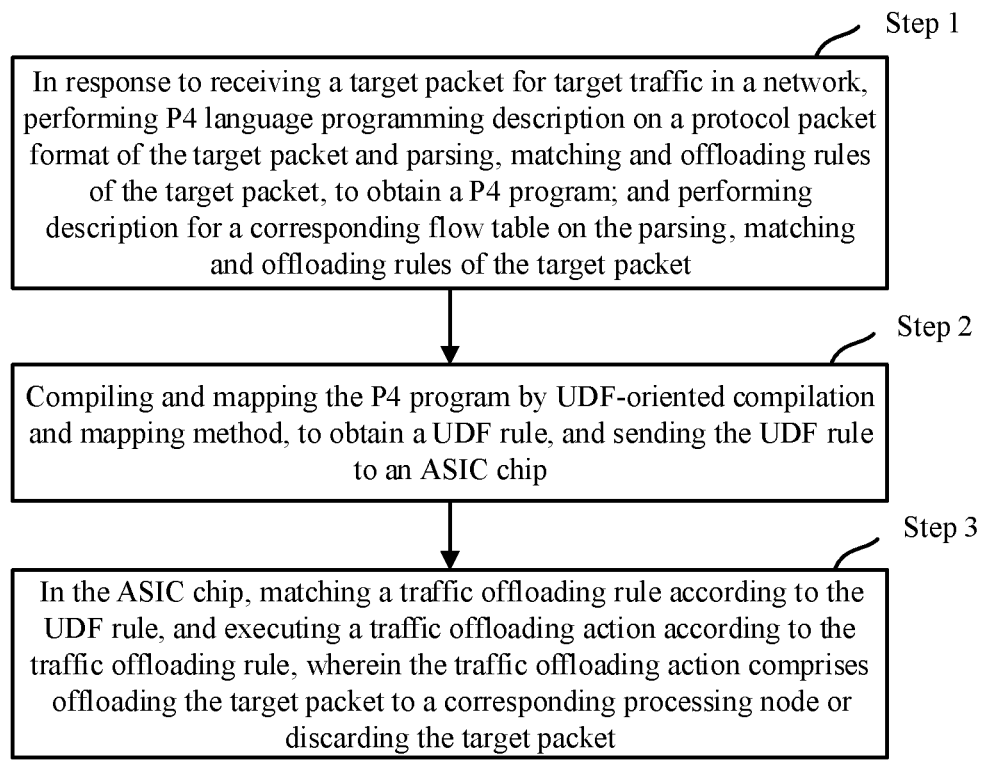
FIG. 1 is a flow diagram of a UDF-based traffic offloading method according to an embodiment of the present disclosure.

As shown in FIG. 1, the UDF-based traffic offloading method provided by the present disclosure includes steps 1, 2 and 3. In step 1, P4 (Programming Protocol-independent Packet Processor) language programming is performed, that is, P4 language programming description is performed on the protocol packet format of a target packet for target traffic in a network and parsing, matching and offloading rules of the target packet, to obtain a P4 program; and a corresponding flow table description is performed on the parsing, matching and offloading rules of the target packet for the target traffic in the network.

The target traffic in the network specifically refers to the packet traffic that involves a large amount of computation and storage and is difficult to be processed by some nodes or core network. The target traffic in the network is processed by the corresponding specialized processing node. For example, named data networking (NDN) protocol traffic has two types of packets: interest packets and data packets, and supports data caching. Unlike IP addresses, the key to NDN protocol parsing is the unique package name. Mobile First (MF) protocol traffic is based on standard Ethernet, and uses GUID (Globally Unique Identifier) to identify various entities, such that the network access entities do not rely on network access points, so the GUID needs to be parsed. Geo (short for GeoNet, geographic indication network) protocol traffic uses the vector composed of information of position longitude and latitude, moving speed and direction, etc. to represent the source address and destination address of packet transmission, so the geographic information vector needs to be parsed. The above packet traffic cannot be processed by some conventional nodes or core networks.

In this embodiment, the target traffic can be MF protocol packets. MF traffic is based on standard Ethernet and cannot be processed by conventional IP nodes or core networks.

In step 2, the P4 program is compiled and mapped by UDF-oriented compilation and mapping method, to obtain a UDF rule, and the UDF rule is sent to an ASIC (Application Specific Integrated Circuit) chip.

Figure 3:
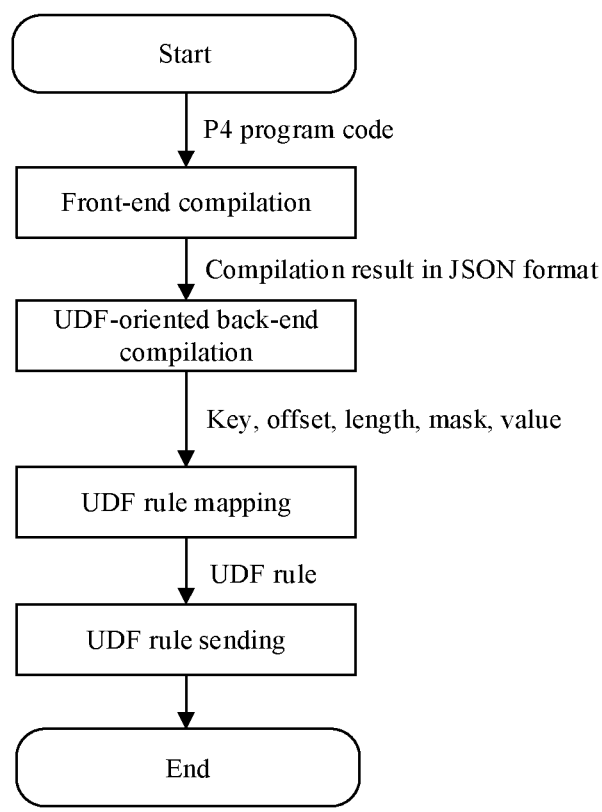
FIG. 3 is a flow diagram for a P4 compilation mapping process according to an embodiment of the present disclosure.

Specifically, as shown in FIG. 3, the UDF-oriented compilation and mapping method in step 2 includes steps S2.1, S2.2, S2.3 and S2.4. In step S2.1, the P4 program is front-end compiled to generate a general front-end compilation result in JSON (JavaScript Object Notation) format. In this embodiment, when the target traffic is MF protocol packet, the JSON content can include MF packet format, parsing process, processing actions, etc.

In step S2.2, UDF-oriented back-end compilation is performed for the P4 program, that is, fields of the target packet, such as key, offset, length, mask and value of the target packet are extracted from the front-end compilation result and the corresponding flow table. In this embodiment, the content extracted from the front-end compilation result is that key is dest_Guid, offset is o1 Bytes, length is l1 Bytes, mask is 0xFFFFFFFF, and value is v1; in step S2.3, UDF-oriented rule mapping is performed, that is, the fields corresponding to a UDF rule in valid fields in the back-end compilation result obtained in step S2.2 are mapped, to generate the corresponding UDF rule. In this embodiment, after the key field is filled in, the UDF rule is UDF RULE="Key dest_guid Offset o1 Length l1 Mask 0xFFFFFF Value v1"; and in step S2.4, the UDF rule is sent to ASIC chips that support UDF.

Figure 4:
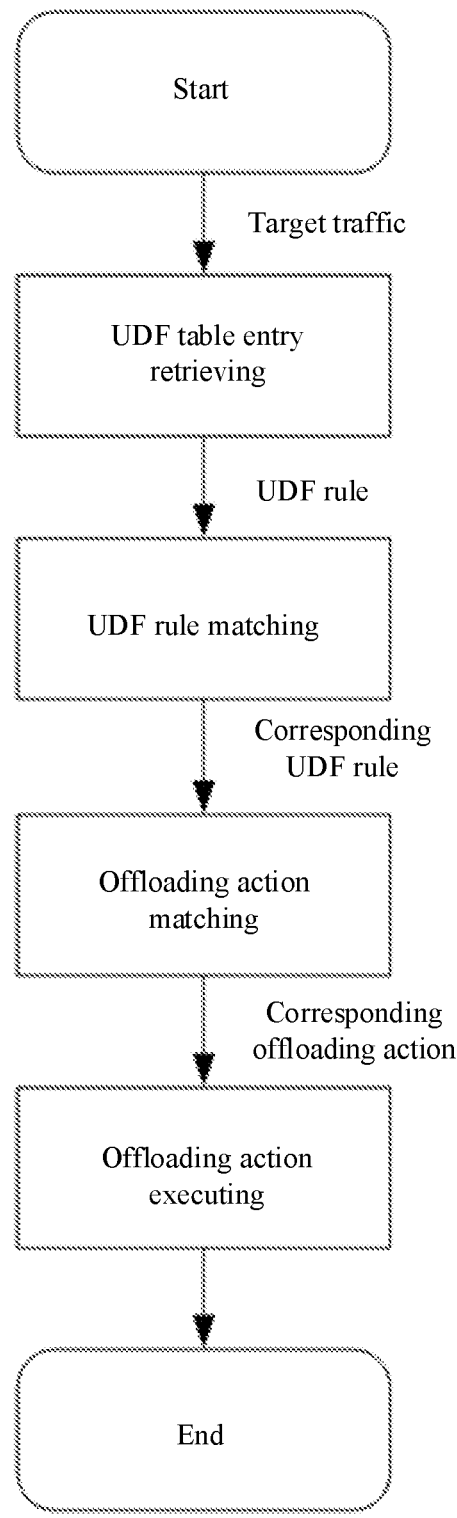
FIG. 4 is a flow diagram for a traffic offloading process according to an embodiment of the present disclosure.

In step 3, in the ASIC chip, a traffic offloading rule is matched according to the UDF rule, and a traffic offloading action is performed according to the traffic offloading rule. The traffic offloading action includes: offloading the target packet to a corresponding processing node or discarding the target packet. As shown in FIG. 4, step 3 includes steps S3.1, S3.2, S3.3 and S3.4. In some embodiments, UDF rules are implemented in the form of a UDF rule table. In step S3.1, a table entry corresponding to the target packet is retrieved in the UDF rule table of the ASIC chip. In this embodiment, the table entry format is as follows:

| ID | Key | Rule |
|---|---|---|
| 1 | dest_guid | Key dest_guid Offest o1 Length l1 Mask 0xFFFFFFFF Value v1 |
| ... | ... | ... |

In step S3.2, an identification field of the target packet is determined according to the table entry corresponding to the target packet, and matching according to the UDF rule of the table entry corresponding to the target packet is performed, to determine the corresponding traffic offloading rule.

The determination of the traffic offloading rule in step S3.2 includes steps S3.2.1, S3.2.2 and S3.2.3. In step S3.2.1, the offloading identification field of the target packet is determined according to the offset and the length in the UDF rule of the table entry corresponding to the target packet. In this embodiment, the identification field is the packet segment field1 with a length equal to l1 starting from an offset of o1 from the packet header.

In step S3.2.2, the offloading identification field is extracted, and "AND" calculation is performed on the offloading identification field and the mask in the UDF rule of the table entry corresponding to the target packet, to obtain the valid matching value. In this embodiment, the valid matching value v_res=field1& 0xFFFFFFFF, that is, field1 is all valid.

In step S3.2.3, an arithmetic matching is performed on the valid matching value and the target value in the UDF rule of the table entry corresponding to the target packet. If the valid matching value and the target value are equal, the traffic offloading rule of the target packet is determined, and the traffic offloading rule includes the ID field, the key field, the offset field and the length field of the table entry corresponding to the target packet. In this embodiment, when v_res=v1, the current rule is matched.

In step S3.3, the traffic offloading action matching is executed, that is, a specific traffic offloading action in the action table is matched according to the traffic offloading rule.

The traffic offloading action matching in step S3.3 includes: according to the ID and key of the traffic offloading rule, forming a binary group index, and matching the specific offloading action from an action table. In this embodiment, the offloading action includes forwarding the target packet to a network port of a corresponding processing node, offloading the target packet to a corresponding processing node, or discarding the target packet.

In step S3.4, the traffic offloading action is executed, the traffic offloading action includes offloading the target packet to a corresponding processing node or discarding the target packet.

Figure 5:
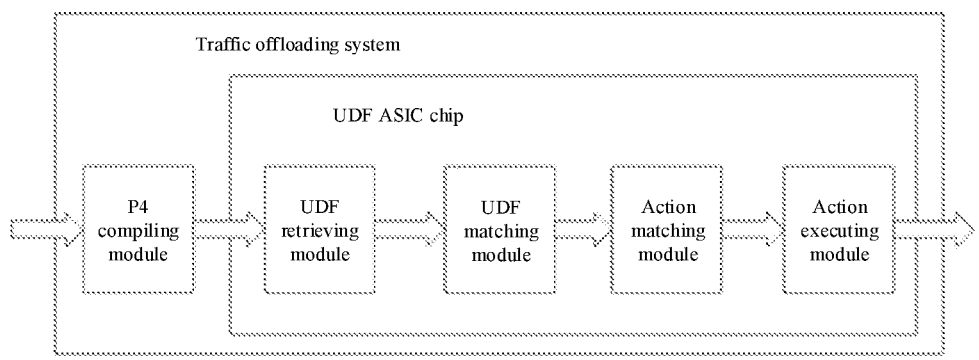
FIG. 5 is a block diagram of a UDF-based traffic offloading system according to an embodiment of the present disclosure.

An embodiment of the present disclosure further provides a UDF-based traffic offloading system. As shown in FIG. 5, the system can include: a P4 compiling module, a UDF retrieving module, a UDF matching module, an action matching module and an action executing module. Target traffic is offloaded according to a rule set by P4 program.

The P4 compiling module is configured to perform front-end and UDF-oriented back-end compilation for a P4 program corresponding to a target packet for target traffic, map the compilation result to a UDF rule and send the UDF rule to a chip. The UDF retrieving module is configured to retrieve a table entry corresponding to the target packet in a UDF rule table in the ASIC chip when receiving the target packet. The UDF matching module is configured to determine an identification field of the target packet according to the table entry corresponding to the target packet, and perform matching according to the UDF rule of the table entry corresponding to the target packet to obtain a corresponding traffic offloading rule. The action matching module is configured to match a specific traffic offloading action from an action table according to the key field, the offset field, the length field, the mask field and the value field of the matched traffic offloading rule.

The action executing module is configured to, according to the traffic offloading action, offload the target packet to a corresponding computing storage processing node or discard the target packet.

Specifically, the UDF retrieving module, the UDF matching module, the action matching module and the action executing module run in the ASIC chip that supports UDF function.

Corresponding to the aforementioned embodiments of the UDF-based traffic offloading method, the present disclosure further provides an embodiment of a UDF-based traffic offloading apparatus.

Figure 6:
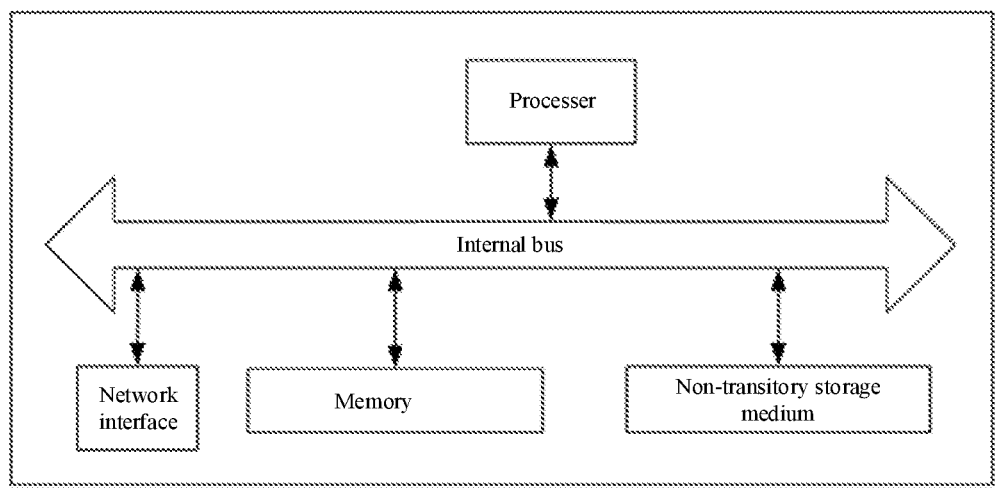
FIG. 6 is a structural diagram of a UDF-based traffic offloading apparatus according to an embodiment of the present disclosure.

Referring to FIG. 6, the UDF-based traffic offloading apparatus provided by the embodiments of the present disclosure includes one or more processors for implementing the UDF-based traffic offloading method in the above embodiments.

The embodiment of the UDF-based traffic offloading apparatus in the present disclosure can be applied to any device with data processing capability, which can be a device or an apparatus such as a computer. The apparatus embodiments can be realized by software, hardware or a combination of software and hardware. Taking software implementation as an example, as an apparatus in a logical sense, the apparatus is formed by reading the corresponding computer program instructions in the non-volatile memory into the memory for operation by the processor of any device capable of data processing. From the hardware level, as shown in FIG. 6, it is a hardware structure diagram of any device with data processing capability where the UDF-based traffic offloading apparatus of the present disclosure is located. In addition to the processor, memory, network interface, and non-volatile memory shown in FIG. 6, any device with data processing capability where the apparatus in the embodiment is located usually includes other hardware based on the actual function of the any device with data processing capability, which will not be described again.

The implementation process of the functions and effects of each unit in the above apparatus is detailed in the implementation process of the corresponding steps in the above method.

Since the apparatus embodiment basically corresponds to the method embodiment, the relevant parts can refer to the partial description of the method embodiment. The apparatus embodiments described above are only schematic, where the units described as separate components can be or cannot be physically separated, and the components shown as units can be or cannot be physical units, that is, they can be located in one place, or they can be distributed to multiple network units. Some or all of the modules can be selected according to the actual needs to achieve the purpose of the scheme of the present disclosure. A person skilled in the art can understand and implement without creative work.

An embodiment of the present disclosure further provides a non-transitory computer-readable storage medium on which a program is stored. When the program is executed by the processor, the UDF-based traffic offloading method in the above embodiments is implemented.

The computer-readable storage medium may be an internal storage unit, such as a hard disk or memory, of any device with data processing capability described in any of the preceding embodiments. The computer-readable storage medium can also be an external storage device, such as a plug-in hard disk, Smart Media Card (SMC), SD card, Flash Card, etc. equipped on the device. Further, the computer-readable storage medium can also include both the internal storage unit of any device with data processing capability and the external storage device. The computer-readable storage medium is used to store the computer program and other programs and data required by the any device with data processing capability, and can also be used to temporarily store the data that has been output or to be output.

The above is only some embodiments of the present disclosure, and does not limit the present disclosure in any form. Although the implementation process of the present disclosure has been described in detail above, those skilled in the art can still modify the technical solutions described in the foregoing examples, or perform equivalent replacements for some of the technical features. All modifications, equivalent substitutions, etc. made within the spirit and principles of the present disclosure shall be included in the protection scope of the present disclosure.

The invention claimed is:

1. A UDF-based traffic offloading method, comprising:
in response to receiving a target packet for target traffic in a network, performing P4 language programming description on a protocol packet format of the target packet and parsing, matching and offloading rules of the target packet, to obtain a P4 program; and performing description for a corresponding flow table on the parsing, matching and offloading rules of the target packet;
compiling and mapping the P4 program by UDF-oriented compilation and mapping method, to obtain a UDF rule, and sending the UDF rule to an ASIC chip, further comprising:
performing front-end compilation for the P4 program to generate a front-end compilation result in JSON format;
performing UDF-oriented back-end compilation for the P4 program to obtain a back-end compilation result, wherein performing UDF-oriented back-end compilation for the P4 program to obtain the back-end compilation result, comprising: extracting a key field, an offset field, a length field, a mask field and a value field of the target packet from the front-end compilation result and the corresponding flow table to obtain the back-end compilation result;
mapping fields corresponding to the UDF rule in the back-end compilation result to generate the corresponding UDF rule;
sending the UDF rule to the ASIC chip that supports UDF;
in the ASIC chip, matching a traffic offloading rule according to the UDF rule, and executing a traffic offloading action according to the traffic offloading rule, wherein the traffic offloading action comprises offloading the target packet to a corresponding processing node or discarding the target packet, further comprising:
retrieving a table entry corresponding to the target packet in a UDF rule table in the ASIC chip;
determining an identification field of the target packet according to the table entry corresponding to the target packet, and performing matching according to the UDF rule of the table entry corresponding to the target packet to determine the corresponding traffic offloading rule, further comprising:
determining an offloading identification field of the target packet according to the offset field and the length field in the UDF rule of the table entry corresponding to the target packet;
extracting the offloading identification field, and performing "AND" calculation on the offloading identification field and the mask field in the UDF rule of the table entry corresponding to the target packet, to obtain a valid matching value;
matching the valid matching value with the value field in the UDF rule of the table entry corresponding to the target packet, and in response to determining that the valid matching value is equal to the value field in the UDF rule of the table entry corresponding to the target packet, determining the traffic offloading rule of the target packet, wherein the traffic offloading rule comprises: ID, the key field, the offset field and the length field of the table entry corresponding to the target packet;
determining the traffic offloading action from an action table according to the traffic offloading rule;
executing the traffic offloading action, wherein the traffic offloading action comprises offloading the target packet to a corresponding processing node or discarding the target packet.

2. The method according to claim 1, wherein the target traffic in the network is a packet traffic processed by the corresponding processing node, involving a large amount of computation and storage, and difficult to be processed by some nodes or core network, and comprises: named data network protocol traffic, mobile first network protocol traffic or geographic identification network protocol traffic.

3. The method according to claim 1, wherein the determining the traffic offloading action from an action table according to the traffic offloading rule comprises:
forming a binary group index according to the ID and the key field of the table entry corresponding to the target packet, and
matching the corresponding traffic offloading action from the action table.

4. A UDF-based traffic offloading apparatus, comprising one or more processors, configured to implement a UDF-based traffic offloading method, comprising:
in response to receiving a target packet for target traffic in a network, performing P4 language programming description on a protocol packet format of the target packet and parsing, matching and offloading rules of the target packet, to obtain a P4 program; and performing description for a corresponding flow table on the parsing, matching and offloading rules of the target packet;
compiling and mapping the P4 program by UDF-oriented compilation and mapping method, to obtain a UDF rule, and sending the UDF rule to an ASIC chip, further comprising:
performing front-end compilation for the P4 program to generate a front-end compilation result in JSON format;
performing UDF-oriented back-end compilation for the P4 program to obtain a back-end compilation result, wherein performing UDF-oriented back-end compilation for the P4 program to obtain the back-end compilation result, comprising: extracting a key field, an offset field-, a length field, a mask field and a value field of the target packet from the front-end compilation result and the corresponding flow table to obtain the back-end compilation result;
mapping fields corresponding to the UDF rule in the back-end compilation result to generate the corresponding UDF rule;
sending the UDF rule to the ASIC chip that supports UDF;
in the ASIC chip, matching a traffic offloading rule according to the UDF rule, and executing a traffic offloading action according to the traffic offloading rule, wherein the traffic offloading action comprises offloading the target packet to a corresponding processing node or discarding the target packet, further comprising:
retrieving a table entry corresponding to the target packet in a UDF rule table in the ASIC chip;
determining an identification field of the target packet according to the table entry corresponding to the target packet, and performing matching according to the UDF rule of the table entry corresponding to the target packet to determine the corresponding traffic offloading rule, further comprising:
determining an offloading identification field of the target packet according to the offset field and the length field in the UDF rule of the table entry corresponding to the target packet;
extracting the offloading identification field, and
performing "AND" calculation on the offloading identification field and the mask field in the UDF rule of the table entry corresponding to the target packet, to obtain a valid matching value;

matching the valid matching value with the value field in the UDF rule of the table entry corresponding to the target packet, and in response to determining that the valid matching value is equal to the value field in the UDF rule of the table entry corresponding to the target packet, determining the traffic offloading rule of the target packet, wherein the traffic offloading rule comprises: ID, the key field, the offset field and the length field of the table entry corresponding to the target packet;
determining the traffic offloading action from an action table according to the traffic offloading rule;
executing the traffic offloading action, wherein the traffic offloading action comprises offloading the target packet to a corresponding processing node or discarding the target packet.

5. A non-transitory computer-readable storage medium storing a program, when the program is executed by a processor, a UDF-based traffic offloading method is implemented, wherein the method comprises:
in response to receiving a target packet for target traffic in a network, performing P4 language programming description on a protocol packet format of the target packet and parsing, matching and offloading rules of the target packet, to obtain a P4 program; and performing description for a corresponding flow table on the parsing, matching and offloading rules of the target packet;
compiling and mapping the P4 program by UDF-oriented compilation and mapping method, to obtain a UDF rule, and sending the UDF rule to an ASIC chip, further comprising:
performing front-end compilation for the P4 program to generate a front-end compilation result in JSON format;
performing UDF-oriented back-end compilation for the P4 program to obtain a back-end compilation result, wherein performing UDF-oriented back-end compilation for the P4 program to obtain the back-end compilation result, comprising: extracting a key field, an offset field, a length field, a mask field and a value field of the target packet from the front-end compilation result and the corresponding flow table to obtain the back-end compilation result;
mapping fields corresponding to the UDF rule in the back-end compilation result to generate the corresponding UDF rule;
sending the UDF rule to the ASIC chip that supports UDF;
in the ASIC chip, matching a traffic offloading rule according to the UDF rule, and executing a traffic offloading action according to the traffic offloading rule, wherein the traffic offloading action comprises offloading the target packet to a corresponding processing node or discarding the target packet, further comprising:
retrieving a table entry corresponding to the target packet in a UDF rule table in the ASIC chip;
determining an identification field of the target packet according to the table entry corresponding to the target packet, and performing matching according to the UDF rule of the table entry corresponding to the target packet to determine the corresponding traffic offloading rule, the step 3.2 comprising:
determining an offloading identification field of the target packet according to the offset field and the length field in the UDF rule of the table entry corresponding to the target packet;

extracting the offloading identification field, and performing "AND" calculation on the offloading identification field and the mask field in the UDF rule of the table entry corresponding to the target packet, to obtain a valid matching value;

matching the valid matching value with the value field in the UDF rule of the table entry corresponding to the target packet, and in response to determining that the valid matching value is equal to the value field in the UDF rule of the table entry corresponding to the target packet, determining the traffic offloading rule of the target packet, wherein the traffic offloading rule comprises: ID, the key field, the offset field and the length field of the table entry corresponding to the target packet;

determining the traffic offloading action from an action table according to the traffic offloading rule;

executing the traffic offloading action, wherein the traffic offloading action comprises offloading the target packet to a corresponding processing node or discarding the target packet.

\* \* \* \* \*